(12) United States Patent
Jeong et al.

(10) Patent No.: US 8,311,149 B2
(45) Date of Patent: Nov. 13, 2012

(54) METHOD AND APPARATUS FOR DISTORTING INPUT SIGNAL OF DIGITAL PREDISTORTION (DPD) POWER AMPLIFIER IN WIRELESS COMMUNICATION SYSTEM

(75) Inventors: Seung-Il Jeong, Yongin-si (KR); Byung-Wook Kim, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 945 days.

(21) Appl. No.: 12/378,072

(22) Filed: Feb. 11, 2009

(65) Prior Publication Data
US 2009/0207938 A1    Aug. 20, 2009

(30) Foreign Application Priority Data
Feb. 15, 2008    (KR) .................. 10-2008-0013770

(51) Int. Cl.
*H04L 25/03*    (2006.01)
*H04K 1/02*    (2006.01)
(52) U.S. Cl. .................. 375/297; 375/295; 375/296
(58) Field of Classification Search .................. 375/297, 375/295, 296
See application file for complete search history.

(56) References Cited

U.S. PATENT DOCUMENTS

| 6,373,902 B1* | 4/2002 | Park et al. .................. 375/296 |
| 2005/0140438 A1* | 6/2005 | Jin et al. .................. 330/149 |

* cited by examiner

*Primary Examiner* — Ted Wang (57) ABSTRACT

A predistortion apparatus of a Digital Pre-Distortion (DPD) power amplifier in a wireless communication system is provided. A method for predistorting an input signal at the predistortion apparatus of the DPD power amplifier includes dividing one or more bits constituting the input signal into upper bits and lower bits; generating two successive address values using the upper bits; generating distortion values of the upper bits corresponding to the address values; calculating a distortion value of the lower bits; and calculating a distortion signal value corresponding to the input signal using the distortion values of the upper bits and the distortion bit of the lower bits. Hence, the time taken to update the LUT can be shortened, the cost can be lowered by the reduced memory capacity, and the power consumption can be decreased.

22 Claims, 8 Drawing Sheets

METHOD AND APPARATUS FOR DISTORTING INPUT SIGNAL OF DIGITAL PREDISTORTION (DPD) POWER AMPLIFIER IN WIRELESS COMMUNICATION SYSTEM

CROSS-REFERENCE TO RELATED APPLICATION(S) AND CLAIM OF PRIORITY

The present application claims the benefit under 35 U.S.C. §119(a) to a Korean patent application filed in the Korean Intellectual Property Office on Feb. 15, 2008 and assigned Serial No. 10-2008-0013770, the entire disclosure of which is hereby incorporated by reference.

TECHNICAL FIELD OF THE INVENTION

The present invention relates generally to a Digital Pre-Distortion (DPD) power amplifier in a wireless communication system. More particularly, the present invention relates to a method and an apparatus for predistorting an input signal in a predistortion apparatus of a DPD power amplifier in a wireless communication system.

BACKGROUND OF THE INVENTION

A transmitter of a wireless communication system improves non-linear characteristics of a power amplifier by use of a predistortion apparatus of a Digital Pre-Distortion (DPD) power amplifier.

The predistortion apparatus pre-distorts a digital signal input to the DPD power amplifier such that an input signal and an output signal of the DPD power amplifier have linear characteristics. The predistortion apparatus pre-distorts the input signal using an inverse function of the non-linear characteristic of the DPD power amplifier generated using an Amplitude Modulation-to-Amplitude Modulation (AM-AM) Look Up Table (LUT), and an AM-to-Phase Modulation (AM-PM) LUT.

The transmitter determines a resolution bit width lest a quantization noise level affect its performance. The LUT of the predistortion apparatus has a memory capacity determined according to the number of data of the LUT corresponding to the resolution bit width. That is, when the resolution bit width rises and the number of data increases, the memory capacity for the LUT of the predistortion apparatus also increases.

As discussed above, when the memory capacity of the LUT increases, disadvantageously, the transmitter raises the product cost, and the time taken to update the LUT extends. In addition, the increases of the LUT update time and the memory capacity consume more of the transmitter power.

SUMMARY OF THE INVENTION

To address the above-discussed deficiencies of the prior art, it is a primary aspect of the present invention to address at least the above mentioned problems and/or disadvantages and to provide at least the advantages described below. Accordingly, an aspect of the present invention is to provide a method and an apparatus for reducing a memory capacity used for a LUT in a predistortion apparatus of a DPD power amplifier of a wireless communication system.

Another aspect of the present invention is to provide a method and an apparatus for reducing an LUT update time in a predistortion apparatus of a DPD power amplifier of a wireless communication system.

Yet another aspect of the present invention is to provide a method and an apparatus for predistorting an input signal of a DPD power amplifier using an interpolation in a predistortion apparatus of the DPD power amplifier of a wireless communication system.

According to one aspect of the present invention, a method for predistorting an input signal at a predistortion apparatus of a DPD power amplifier includes dividing one or more bits constituting the input signal into upper bits and lower bits; generating two successive address values using the upper bits; generating distortion values of the upper bits corresponding to the address values; calculating a distortion value of the lower bits; and calculating a distortion signal value corresponding to the input signal using the distortion values of the upper bits and the distortion bit of the lower bits.

According to another aspect of the present invention, a predistortion apparatus of a DPD power amplifier includes a 2-step sequence address generator for generating two successive address values using upper bits of the upper bits and lower bits divided from one or more bits constituting an input signal; a memory block for generating distortion values of upper bits corresponding to the address values respectively; a multiplier for producing a distortion value of the lower bits by multiplying the distortion values of the upper bits by the lower bits; and an adder for calculating a distortion signal value corresponding to the input signal by adding the distortion values of the upper bits and the distortion value of the lower bits.

According to yet another aspect of the present invention, a predistortion apparatus of a DPD power amplifier includes a boundary detector for checking a linear characteristic or a non-linear characteristic of an input signal; at least two 2-step sequence address generators according to the characteristic of the input signal, for generating two successive address values using upper bits among the upper bits and lower bits divided in a ratio of upper bits and lower bits determined by the characteristic of the input signal; at least two memory blocks according to the characteristic of the input signal, for generating distortion values of upper bits corresponding to the address values respectively; at least two multipliers according to the characteristic of the input signal, for calculating a distortion value of the lower bits by multiplying the distortion values of the upper bits by the lower bits; and at least two adders according to the characteristic of the input signal, for calculating a distorted signal value corresponding to the input signal by adding the distortion values of the upper bits and the distortion value of the lower bits.

Other aspects, advantages, and salient features of the invention will become apparent to those skilled in the art from the following detailed description, which, taken in conjunction with the annexed drawings, discloses exemplary embodiments of the invention.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

Throughout the drawings, like reference numerals will be understood to refer to like parts, components and structures.

DETAILED DESCRIPTION OF THE INVENTION

FIGS. 1 through 8, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communication system. The following description with reference to the accompanying drawings is provided to assist in a comprehensive understanding of exemplary embodiments of the present invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

Exemplary embodiments of the present invention provide a technique for predistorting a transmit signal using a LUT in a predistortion apparatus of a DPD power amplifier of a wireless communication system.

The DPD power amplifier includes the predistortion apparatus and an amplifier for linear characteristics of the input and the output. The predistortion apparatus distorts the input signal of the DPD power amplifier for the linear characteristics of the input and the output of the DPD power amplifier. The amplifier amplifies the signal distorted by the predistortion apparatus.

To reduce a memory capacity of the LUT, the predistortion apparatus does not store every distortion signal value corresponding to each transmit signal value that can be transmitted from a transmitter. Namely, the predistortion apparatus stores only the distortion signal values corresponding to some of the transmit signals transmittable by the transmitter. When a transmit signal corresponding to the distortion signal value not stored is input, the predistortion apparatus generates a distortion signal of the transmit signal using interpolation. Structure and operation of the power amplifier for predistorting the transmit signal are now described.

Figure 1:
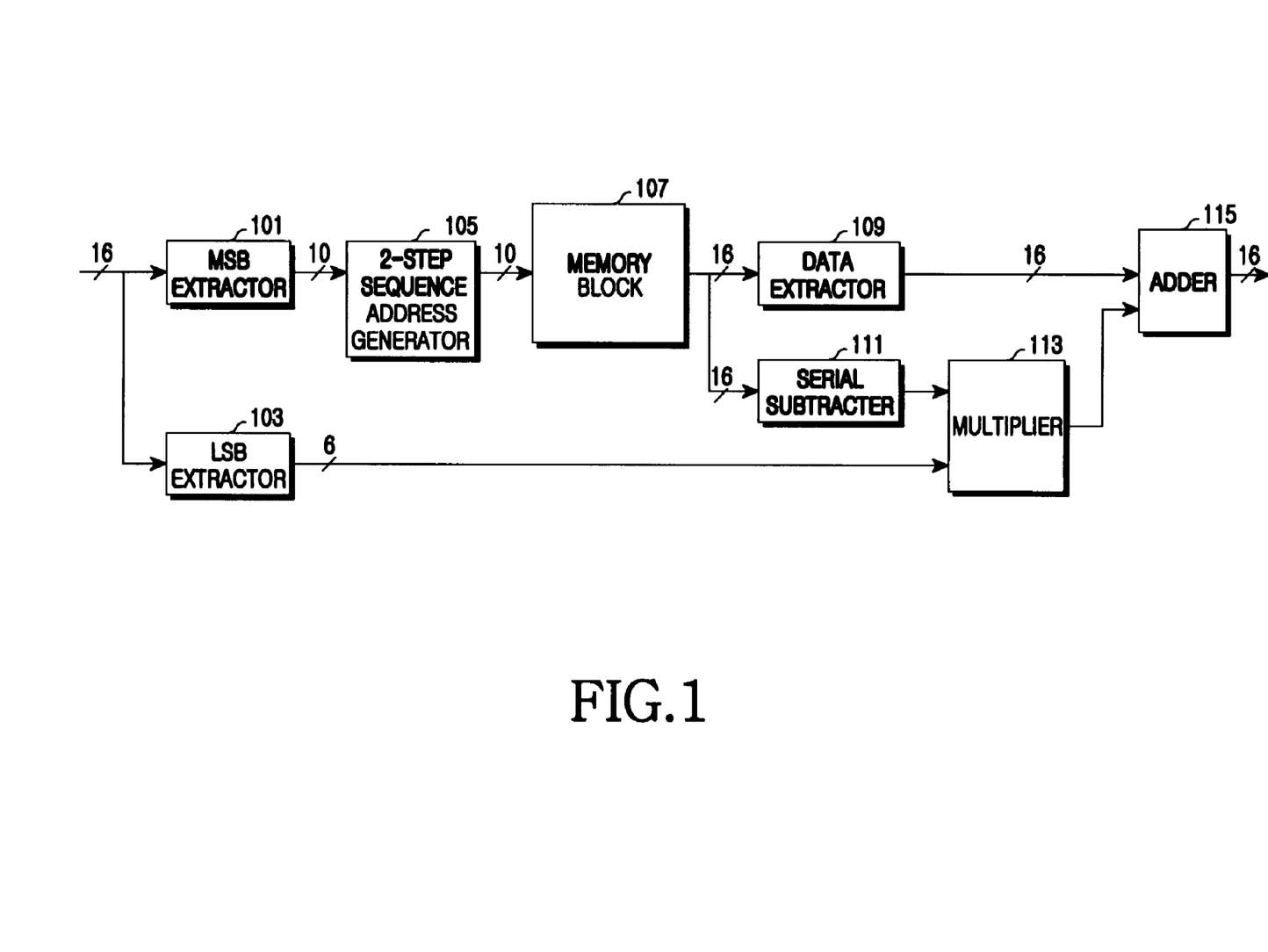
FIG. 1 is a block diagram of a predistortion apparatus of a Digital Pre-Distortion power amplifier according to one exemplary embodiment of the present invention.

FIG. 1 is a block diagram of a predistortion apparatus of a DPD power amplifier according to one exemplary embodiment of the present invention.

The predistortion apparatus of FIG. 1 includes a Most Significant Bit (MSB) extractor 101, a Least Significant Bit (LSB) extractor 103, a 2-step sequence address generator 105, a memory block 107, a data extractor 109, a serial subtracter 111, a multiplier 113, and an adder 115.

The MSB extractor 101 extracts upper bits of the digital transmit signal value input to the predistortion apparatus. The LSB extractor 103 extracts lower bits of the digital transmit signal value input to the predistortion apparatus. For example, when the transmit signal value includes sixteen (16) bits, the MSB extractor 101 extracts ten (10) upper bits and the LSB extractor 103 extracts six (6) lower bits. The upper bits extracted by the MSB extractor 101 are used as an address value to retrieve the distorted transmit signal value from the memory block 107. The ratio of the bits extracted by the MSB extractor 101 and the bits extracted by the LSB extractor 103 is determined by characteristics of the power amplifier.

The 2-step sequence address generator 105 generates two sequential address values using the upper bits extracted by the MSB extractor 101. For example, when the MSB extractor 101 extracts the upper bits '101010000', the 2-step sequence address generator 105 generates the sequential address values '101010000' and '101010001'.

The memory block 107 stores the transmit signal value transmittable by the transmitter and the distorted signal values corresponding to the transmit signal value. The transmit signal value corresponds to the address value provided from the 2-step sequence address generator 105. Hence, the memory block 107 selects and outputs the distorted signal value corresponding to the address value provided from the 2-step sequence address generator 105.

The data extractor 109 extracts the distorted signal value first provided among the two distorted signal values output from the memory block 107.

The serial subtracter 111 calculates a difference value of the two distorted signal values output from the memory block 107.

The multiplier 113 multiplies the difference value of the distorted signal values output from the serial subtracter 111 by the lower bits output from the LSB extractor 103. The product acquired at the multiplier 113 indicates the distortion value of the transmit signal corresponding to the lower bits extracted by the LSB extractor 103.

The adder 115 adds the product output from the multiplier 113 and the value output from the data extractor 109. The output of the adder 115 is the output of the predistortion apparatus. Accordingly, the amplifier amplifies the output signal of the adder 115.

In this embodiment, the predistortion apparatus generates the distortion signal of the transmit signal using the distorted signal values in the LUT of the memory block 107. Yet, when there is no distortion signal corresponding to the transmit signal in the LUT, the predistortion apparatus includes a distortion signal calculator (not shown) that generates the distortion signal for the transmit signal. The distortion signal calculator generates the distortion signal of the transmit signal using the interpolation.

Figure 2:
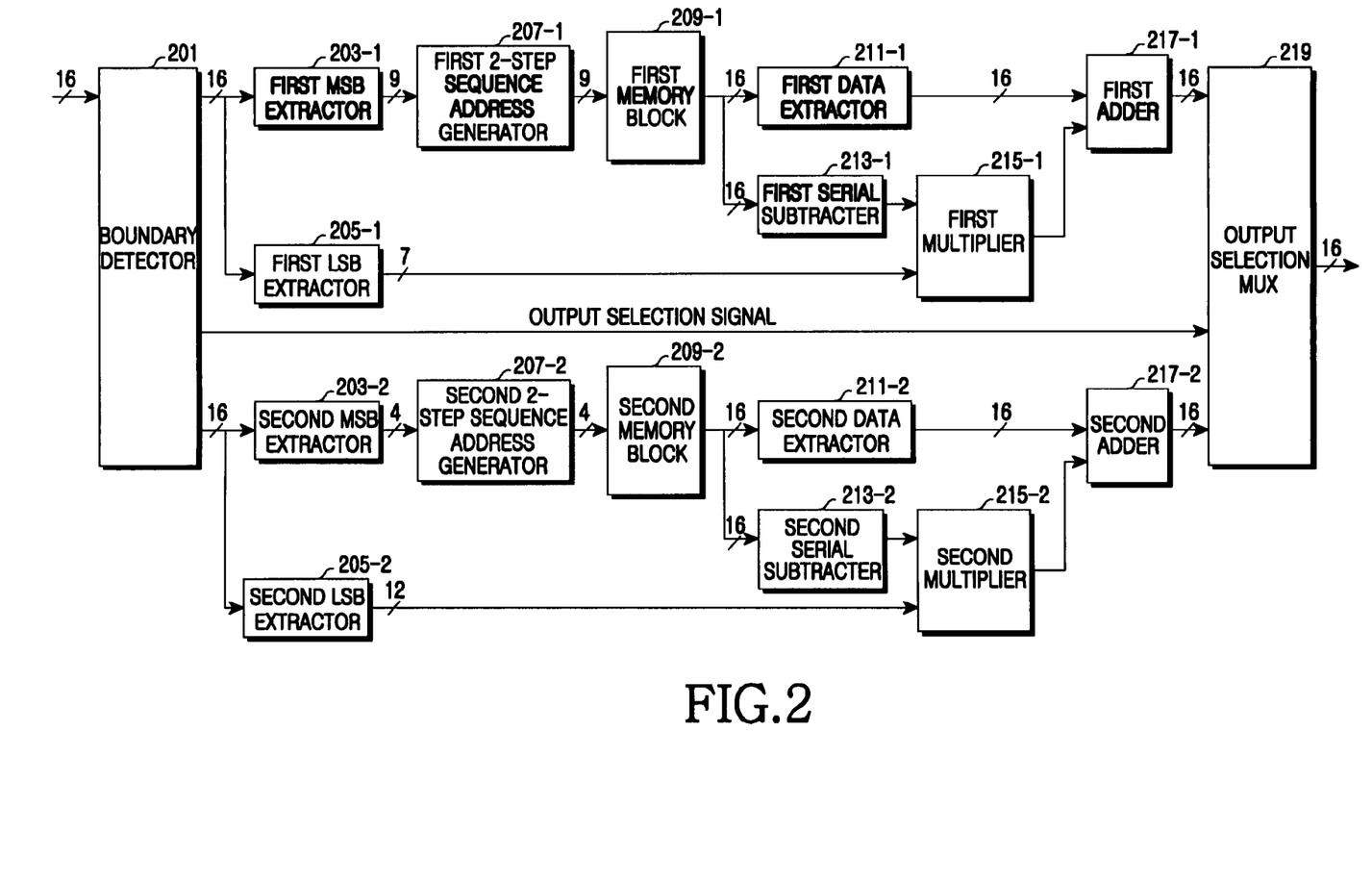
FIG. 2 is a block diagram of a predistortion apparatus of the Digital Pre-Distortion power amplifier according to another exemplary embodiment of the present invention.

FIG. 2 illustrates a block diagram of a predistortion apparatus of the DPD power amplifier according to another exemplary embodiment of the present invention.

The predistortion apparatus of FIG. 2 includes a boundary detector 201, MSB extractors 203-1 and 203-2, LSB extractors 205-1 and 205-2, 2-step sequence address generators 207-1 and 207-2, memory blocks 209-1 and 209-2, data extractors 211-1 and 211-2, serial subtracters 213-1 and 213-2, multipliers 215-1 and 215-2, adders 217-1 and 217-2, and an output selection Multiplex (MUX) 219.

The boundary detector 201 divides the digital transmit signals fed to the predistortion apparatus into transmit signals of the linear characteristic and transmit signals of the non-linear characteristic. That is, the amplifier has the linear characteristic in the low output and the non-linear characteristic in the high output. Correspondingly, the boundary detector 201 divides the digital transmit signals fed to the predistortion apparatus into the linear transmit signals and the non-linear transmit signals. In so doing, a threshold for distinguishing the linear transmit signal and the non-linear transmit signal may vary according to characteristics of the amplifier.

The boundary detector 201 sends the non-linear transmit signals to the first MSB extractor 203-1 and the first LSB extractor 205-1 and sends the linear transmit signals to the second MSB extractor 203-2 and the second LSB extractor 205-2. The boundary detector 201 provides the output selection MUX 219 with an output selection signal according to the division information of the linear transmit signals and the non-linear transmit signals.

The first MSB extractor 203-1 extracts upper bits from the non-linear transmit signal value output from the boundary detector 201. The first LSB extractor 205-1 extracts lower bits from the non-linear transmit signal value output from the boundary detector 201. For example, when the transmit signal value includes sixteen (16) bits, the first MSB extractor 203-1 extracts nine (9) upper bits of the transmit signal value and the first LSB extractor 205-1 extracts seven (7) lower bits of the transmit signal value. The upper bits extracted by the first MSB extractor 203-1 are used as the address value for retrieving the distorted transmit signal value from the first memory block 209-1. The ratio of the bits extracted by the first MSB extractor 203-1 and the bits extracted by the first LSB extractor 205-1 is determined by characteristics of the power amplifier.

The second MSB extractor 203-2 extracts upper bits from the linear transmit signal value output from the boundary detector 201. The second LSB extractor 205-2 extracts lower bits from the linear transmit signal value output from the boundary detector 201. For example, when the transmit signal value includes sixteen (16) bits, the second MSB extractor 203-2 extracts four (4) upper bits of the transmit signal value and the second LSB extractor 205-2 extracts twelve (12) lower bits of the transmit signal value. The upper bits extracted by the second MSB extractor 203-2 are used as the address value for retrieving the distorted transmit signal value from the second memory block 209-2. The ratio of the bits extracted by the second MSB extractor 203-2 and the bits extracted by the second LSB extractor 205-2 is determined by the characteristics of the power amplifier.

To represent the linear characteristic with respect to the non-linear transmit signal, the resolution bit width should be great. As such, the size of the upper bits extracted by the first MSB extractor 203-1 for processing the non-linear transmit signal is set to be greater than that of the upper bits extracted by the second MSB extractor 203-2 for processing the linear transmit signal.

The first 2-step sequence address generator 207-1 generates two sequential address values using the upper bits provided from the first MSB extractor 203-1. For example, when the first MSB extractor 203-1 extracts the upper bits '101000000', the first 2-step sequence address generator 207-1 generates the sequential address values '101000000' and '1010000001'.

The second 2-step sequence address generator 207-2 generates two sequential address values using the upper bits provided from the second MSB extractor 203-2. For example, when the second MSB extractor 203-2 extracts the upper bits '1010', the second 2-step sequence address generator 207-2 generates the sequential address values '1010' and '1011'.

The first memory block 209-1 stores the non-linear transmit signal value and the distorted signal values corresponding to the transmit signal value. The transmit signal value corresponds to the address value provided from the first 2-step sequence address generator 207-1. The first memory block 209-1 selects and outputs the distorted signal value corresponding to the address value provided from the first 2-step sequence address generator 207-1. That is, the first memory block 209-1 selects and outputs the distorted signal value of the non-linear transmit signal.

The second memory block 209-2 stores the linear transmit signal value and the distorted signal values corresponding to the transmit signal value. The transmit signal value corresponds to the address value provided from the second 2-step sequence address generator 207-2. The second memory block 209-2 selects and outputs the distorted signal value corresponding to the address value provided from the second 2-step sequence address generator 207-2. That is, the second memory block 209-2 selects and outputs the distorted signal value of the linear transmit signal.

To represent the linear characteristic with respect to the non-linear transmit signal, the resolution bit width should be great. Since the size of the upper bits extracted by the first MSB extractor 203-1 is greater than that of the upper bits extracted by the second MSB extractor 203-2, the number of data stored to the first memory block 209-1 is greater than that of data stored to the second memory block 209-2.

The first data extractor 211-1 extracts the distorted signal value first provided among the two distorted non-linear signal values output from the first memory block 209-1.

The second data extractor 211-2 extracts the distorted signal value first provided among the two distorted linear signal values output from the second memory block 209-2.

The first serial subtracter 213-1 calculates a difference value of the two distorted signal values output from the first memory block 209-1. The second serial subtracter 213-2 calculates a difference value of the two distorted signal values output from the second memory block 209-2.

The first multiplier 215-1 multiplies the difference value of the distorted signal values provided from the first serial subtracter 213-1 by the lower bits provided from the first LSB extractor 205-1. The second multiplier 215-2 multiplies the lower bits provided from the second serial subtracter 213-2. The product acquired by the first multiplier 215-1 indicates the distortion value of the transmit signal corresponding to the lower bits extracted by the first LSB extractor 205-1. The product acquired by the second multiplier 215-2 indicates the distortion value of the transmit signal corresponding to the lower bits extracted by the second LSB extractor 205-2.

The first adder 217-1 adds the product output from the first multiplier 215-1 and the value provided from the first data extractor 211-1. The second adder 217-2 adds the product output from the second multiplier 215-2 and the value provided from the second data extractor 211-2.

The output selection MUX 219 selects either the value output from the first adder 217-1 or the value output from the second adder 217-2 according to the output selection signal fed from the boundary detector 201. For example, when the output selection signal selects the non-linear transmits signal, the output selection MUX 219 selects the value output from the first adder 217-1. When the output selection signal selects the linear transmit signal, the output selection MUX 219 selects the value output from the second adder 217-2.

The value selected at the output selection MUX 219 is the output of the predistortion apparatus. Accordingly, the amplifier amplifies the value selected by the output selection MUX 219.

In this embodiment, the predistortion apparatus generates the distortion signal of the transmit signal using the distorted signal values of the LUTs of the memory blocks 209-1 and 209-2. When the LUT includes no distortion signals corresponding to the transmit signal, the predistortion apparatus includes a distortion signal calculator (not shown) which generates the distortion signal for the transmit signal. The distortion signal calculator generates the distortion signal according to the transmit signal using the interpolation.

Now, the 2-step sequence address generator, the data extractor, the serial subtracter, and the boundary detector of the predistortion apparatus are described in more detail. Hereafter, it is assumed that the predistortion apparatus processes three (3) bits.

Figure 3:
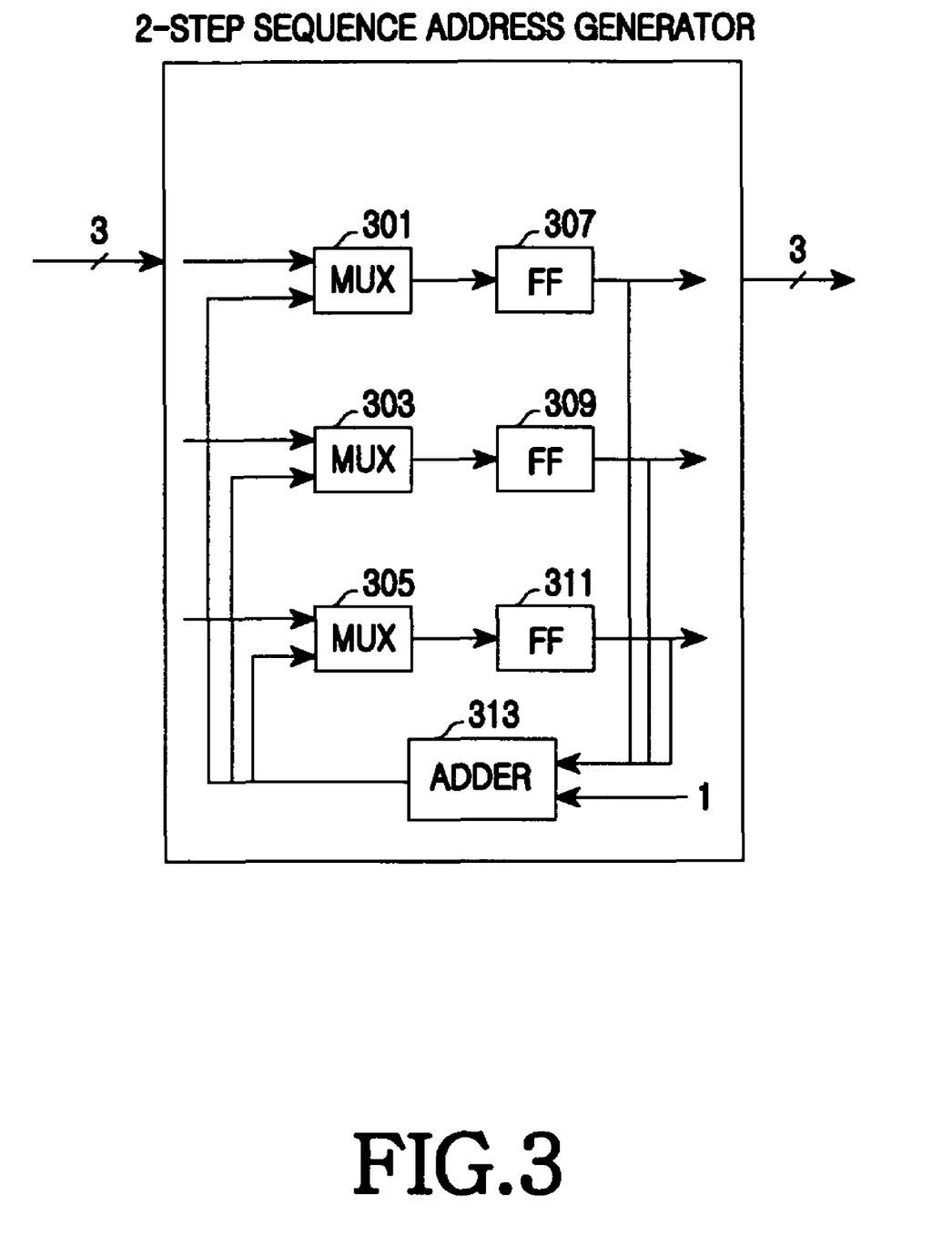
FIG. 3 is a detailed block diagram of a 2-step sequence address generator according to an exemplary embodiment of the present invention.

The 2-step sequence address generator is constructed as shown in FIG. 3.

FIG. 3 illustrates a detailed block diagram of the 2-step sequence address generator according to an exemplary embodiment of the present invention.

The 2-step sequence address generator of FIG. 3 includes MUXs 301, 303 and 305, Flip Flops (FFs) 307, 309 and 311, and an adder 313.

When the clock is zero, the MUXs 301, 303 and 305 apply their upper input value to the FFs 307, 309 and 311. When the clock is '1', the MUXs 301, 303 and 305 apply their lower input value to the FFs 307, 309 and 311. For example, when the input of the 2-step sequence address generator is '101', the upper input value of the first MUX 301 is '1', the upper input value of the second MUX 303 is '0', and the upper input value of the third MUX 305 is '1'. When the clock becomes zero, the first MUX 301 applies the upper input value '1' to the first FF 307, the second MUX 303 applies the upper input value '0' to the second FF 309, and the third MUX 305 applies the upper input value '1' to the third FF 311. The clock cycle of the MUXs 301, 303 and 305 is double the clock cycle of the FFs 307, 309 and 311.

When the applied clock rises, the FFs 307, 309 and 311 output the value fed from the MUXs 301, 303 and 305. For example, when the clock rises, the first FF 307 outputs '1', the second FF 309 outputs '0', and the third FF 311 outputs '1'.

The adder 313 adds '101' fed from the FFs 307, 309 and 311 and '1' of the different input stage and produces '110' to the lower end of the MUXs 301, 303 and 305. For instance, the adder 313 inputs '1' as the lower input value of the first MUX 301, inputs '1' as the lower input value of the second MUX 303, and inputs '0' as the lower input value of the third MUX 305.

Hence, when the clock becomes '1', the first MUX 301 applies the lower input value '1' to the first FF 307, the second MUX 303 applies the lower input value '1' to the second FF 309, and the third MUX 305 applies the lower input value '0' to the third FF 311.

Figure 4:
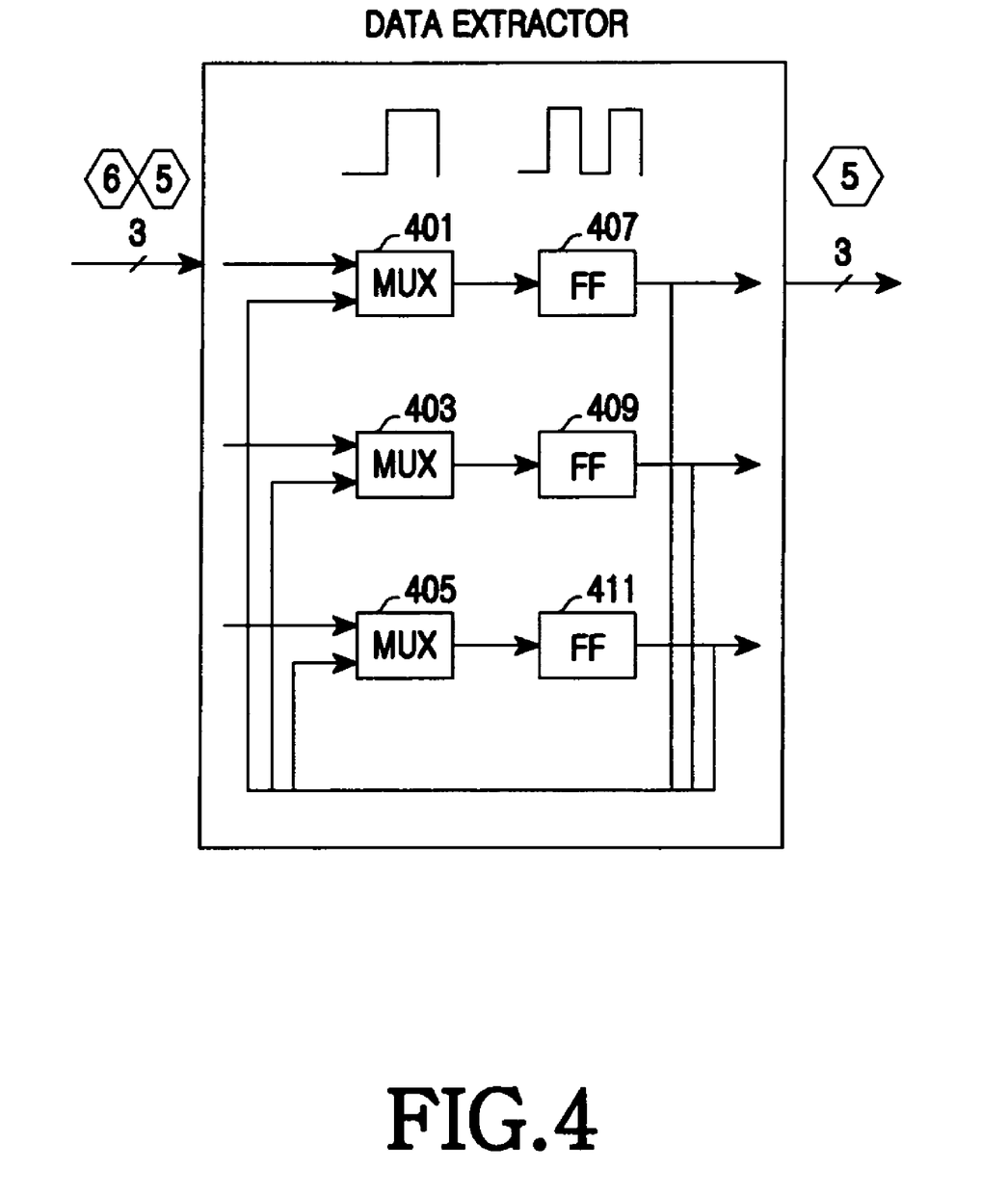
FIG. 4 is a detailed block diagram of a data extractor according to an exemplary embodiment of the present invention.

The data extractor is constructed as shown in FIG. 4.

FIG. 4 illustrates a detailed block diagram of the data extractor according to an exemplary embodiment of the present invention.

The data extractor of FIG. 4 includes MUXs 401, 403 and 405 and FFs 407, 409 and 411.

When the clock is zero, the MUXs 401, 403 and 405 apply their upper input value to the FFs 407, 409 and 411. When the clock is '1', the MUXs 401, 403 and 405 apply their lower input value to the FFs 407, 409 and 411. For example, when '101' and '110' are fed from the memory block in order, the upper input value of the first MUX 401 is '1', the upper input value of the second MUX 403 is '0', and the upper input value of the third MUX 405 is '1'. When the clock becomes zero, the first MUX 401 applies the upper input value '1' to the first FF 407, the second MUX 403 applies the upper input value '0' to the second FF 409, and the third MUX 405 applies the upper input value '1' to the third FF 411. The clock cycle of the MUXs 401, 403 and 405 is double the clock cycle of the FFs 407, 409 and 411.

When the applied clock rises, the FFs 407, 409 and 411 output the value fed from the MUXs 401, 403 and 405. For example, when the clock rises, the first FF 407 outputs '1', the second FF 409 outputs '0', and the third FF 411 outputs '1'.

The output values of the FFs 407, 409 and 411 are fed to the lower ends of the MUXs 401, 403 and 405 respectively. Accordingly, in the clock '1', the MUXs 401, 403 and 405 apply their lower input value to the FFs 407, 409 and 411.

When the clock becomes '1', the first MUX 401 applies the lower input value '1' to the first FF 407, the second MUX 403 applies the lower input value '0' to the second FF 409, and the third MUX 405 applies the upper input value '1' to the third FF 411.

In result, the data extractor outputs '101' in every clock.

Figure 5:
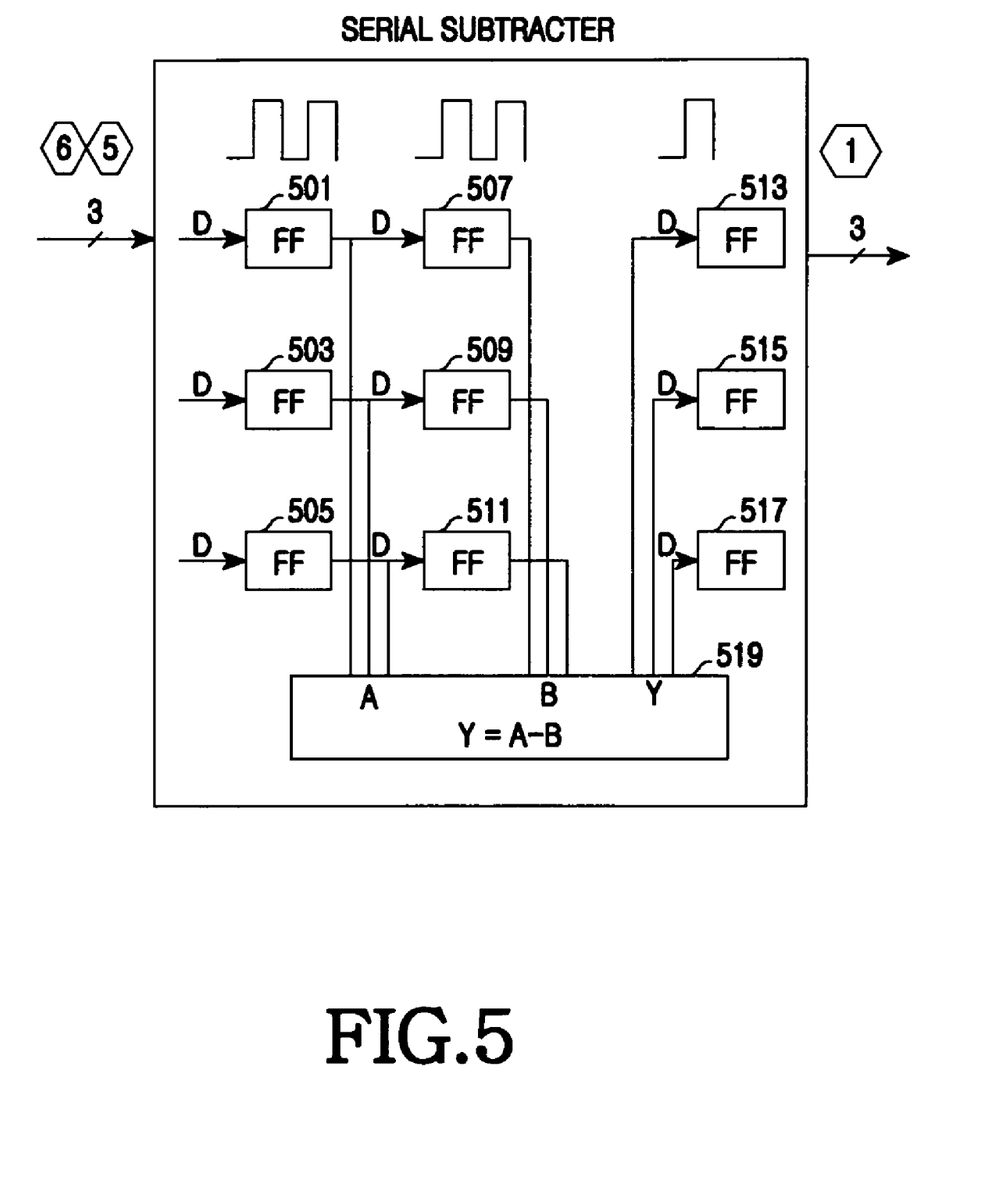
FIG. 5 is a detailed block diagram of a serial subtracter according to an exemplary embodiment of the present invention.

The serial subtracter is constituted as shown in FIG. 5.

FIG. 5 illustrates a detailed block diagram of the serial subtracter according to an exemplary embodiment of the present invention.

The serial subtracter of FIG. 5 includes FFs 501 through 517 and an operator 519.

The FFs 501 through 517 output the input value in the rising clock. For example, when '101' and '110' are fed from the memory block in order, '1' is input to the first FF 501, '0' is input to the second FF 503, and '1' is input to the third FF 505.

When the clock rises, the first FF 501 applies '1' to the fourth FF 507, the second FF 503 applies '0' to the fifth FF 509, and the third FF 505 applies '1' to the sixth FF 511. In addition, '1' is input to the first FF 501, '1' is input to the second FF 503, and '0' is input to the third FF 505.

Hence, when the clock rises, the first FF 501, the second FF 503, and the third FF 505 output '110' to the operator 519. The fourth FF 507, the fifth FF 509, and the sixth FF 511 output '110'.

The operator 519 calculates a difference of the value fed from the first FF 501, second FF 503, and the third FF 505, and the value fed from the fourth FF 507, the fifth FF 509, and the sixth FF 511. The operator 519 outputs the difference to the seventh FF 513, the eighth FF 515, and the ninth FF 519.

Figure 6:
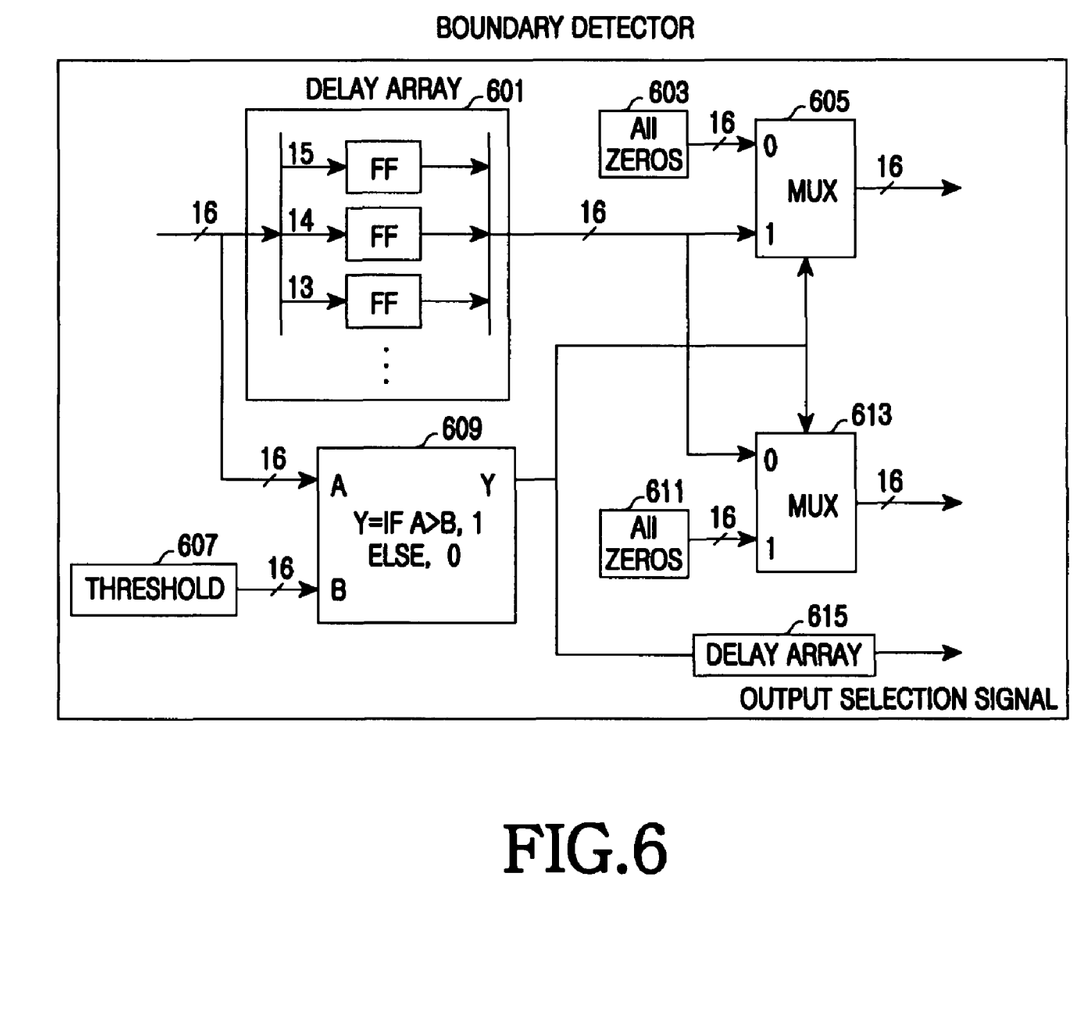
FIG. 6 is a detailed block diagram of a boundary detector according to an exemplary embodiment of the present invention.

The boundary detector is constituted as shown in FIG. 6.

FIG. 6 illustrates a detailed block diagram of the boundary detector according to an exemplary embodiment of the present invention.

When '101' is input, the boundary detector of FIG. 6 applies the input signal to a delay array 601 and an operator 609. The delay array 601 delays the input signal while the operator 609 performs its operation.

The operator 609 compares a threshold 607 with the input signal and checks whether the input signal exceeds the threshold 607. When the input signal exceeds the threshold 607, the operator 609 outputs '1'. When the input signal does not exceed the threshold 607, the operator 609 outputs '0'. The output signal of the operator 609 controls the output of MUXs 605 and 613 and is used as the output selection signal for the output selection MUX 219.

According to the output signal of the operator 609, the MUXs 605 and 613 select and output the input signal fed from the delay array 601. For example, when the operator 609 outputs '0', the second MUX 613 selects and outputs the input signal. When the operator 609 outputs '1', the first MUX 605 selects and outputs the input signal.

Hereafter, a method for predistorting the input signal at the predistortion apparatus is explained.

Figure 7:
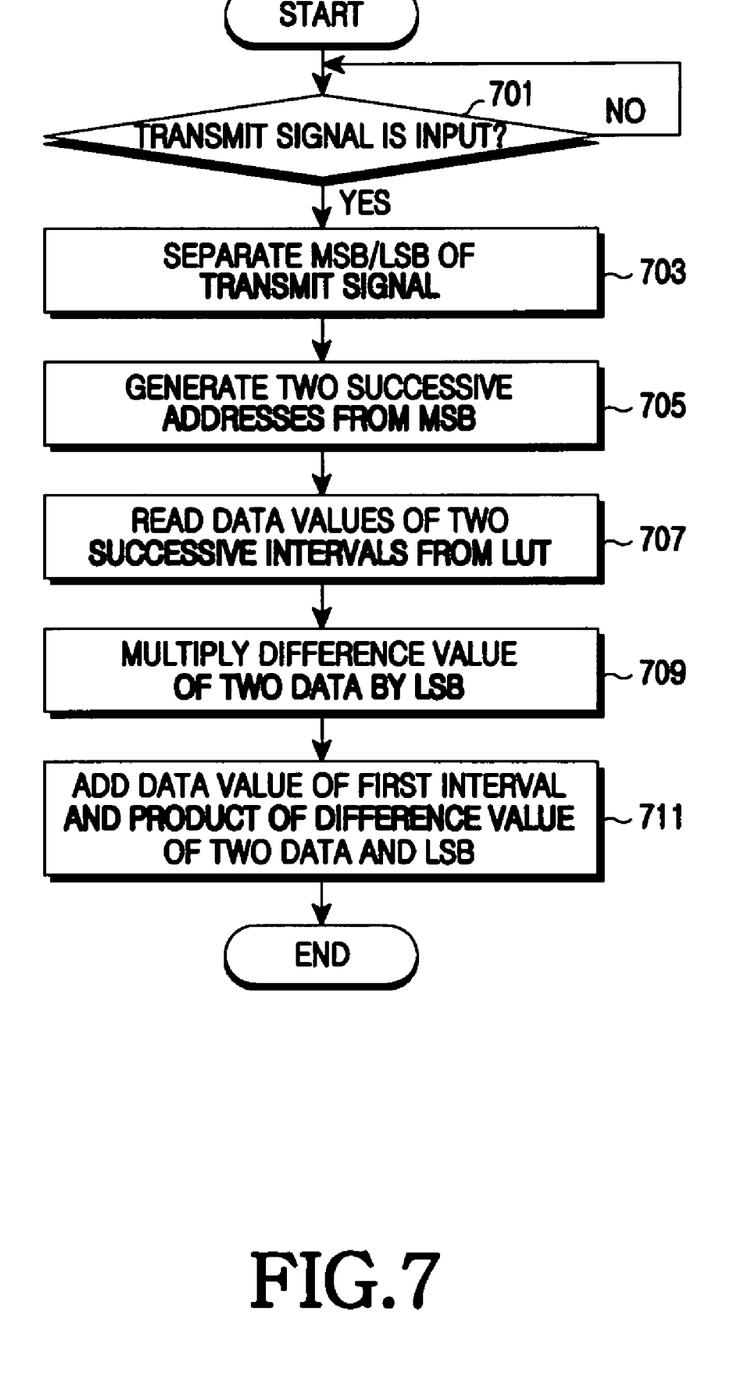
FIG. 7 is a flowchart of a method for predistorting an input signal of the predistortion apparatus in the wireless communication system according to one exemplary embodiment of the present invention.

FIG. 7 is a flowchart outlining the method for predistorting the input signal of the predistortion apparatus in the wireless communication system according to one exemplary embodiment of the present invention.

In step 701, the predistortion apparatus checks whether the transmitter inputs the transmit signal to the DPD power amplifier to transmit the signal.

When the transmit signal is input, the predistortion apparatus divides the input transmit signal to upper bits and lower bits in step 703. For example, when the transmit signal value includes sixteen (16) bits, the predistortion apparatus extracts ten-bit (10-bit) upper bits and six-bit (6-bit) lower bits. In doing so, the upper bits extracted at the predistortion apparatus are used as the address value for retrieving the distorted transmit signal value in the memory block. The ratio of the upper bits and the lower bits is determined by the characteristics of the power amplifier.

In step 705, the predistortion apparatus generates two sequential address values using the upper bits. More specifically, the predistortion apparatus successively generates the input address value and the next address value of the upper bits. For example, given the upper bits '1010000000', the predistortion apparatus sequentially generates '1010000000' and '1010000001'.

In step 707, the predistortion apparatus confirms the distorted transmit values corresponding to the two generated address values. The address value indicates the transmit signal value.

In step 709, the predistortion apparatus multiplies the difference of the two sequential address values by the lower bits. The product of the multiplication is the distorted signal value of the transmit signal corresponding to the lower bits.

In step 711, the predistortion apparatus adds the distorted transmit value corresponding to the address value generated in step 705, and the product acquired in step 709. The output value of the predistortion apparatus indicates the distorted signal value corresponding to the transmit signal fed in step 701.

Next, the predistortion apparatus finishes this process.

In this embodiment, the predistortion apparatus generates the distortion signal according to the transmit signal using the distorted signal values of the LUT of the memory block. When the LUT contains no distortion signal corresponding to the transmit signal, the predistortion apparatus can generate the distortion signal of the transmit signal using the interpolation.

When the predistortion apparatus distorts the transmit signal as above, the amplifier amplifies and transmits the distorted transmit signal.

Figure 8:
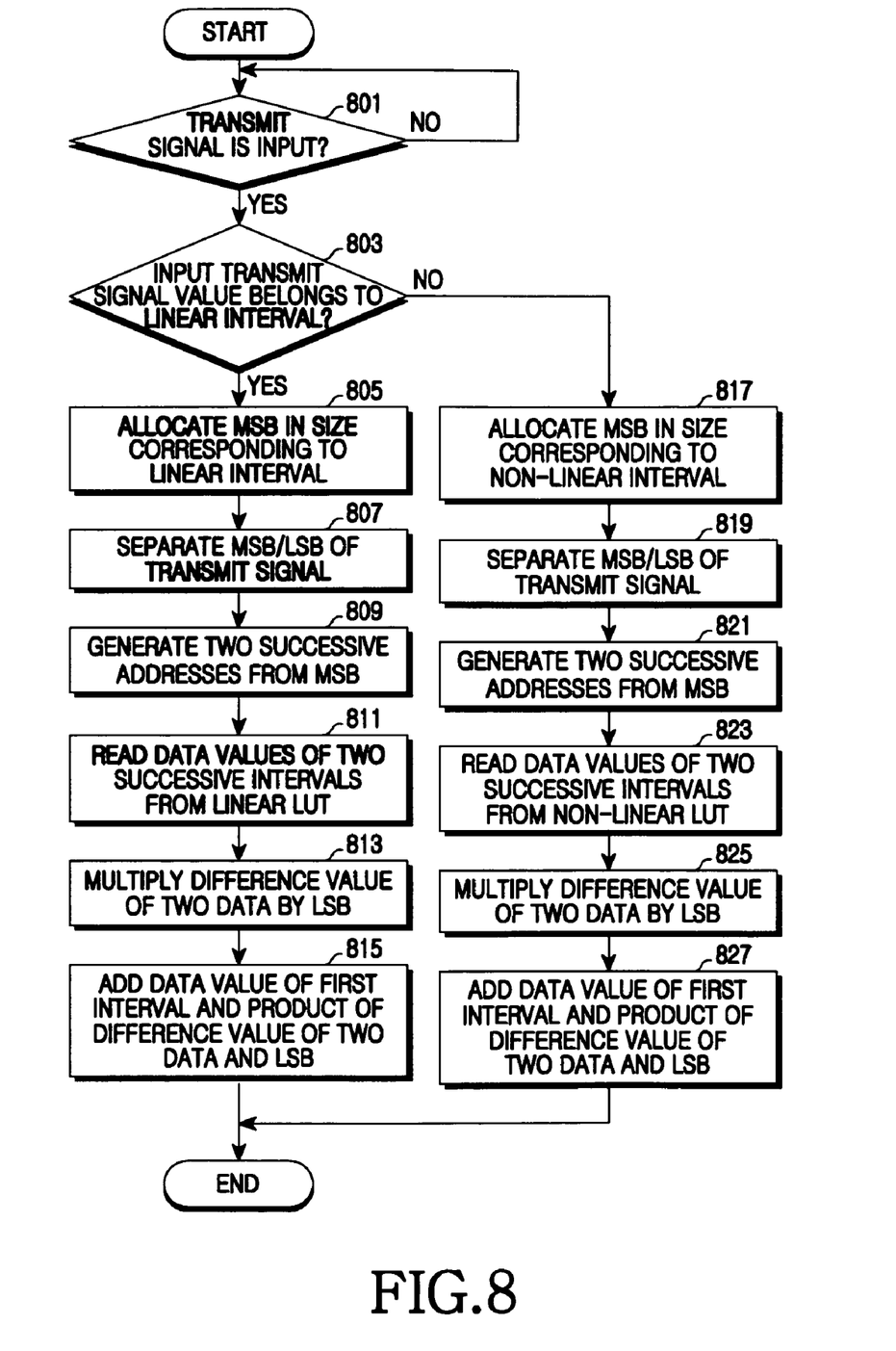
FIG. 8 is a flowchart of a method for predistorting the input signal of the predistortion apparatus in the wireless communication system according to another exemplary embodiment of the present invention.

FIG. 8 illustrates a flowchart of a method for predistorting the input signal of the predistortion apparatus in the wireless communication system according to another exemplary embodiment of the present invention.

In step 801, the predistortion apparatus checks whether the transmitter inputs the transmit signal to the DPD power amplifier to send the transmit signal.

When the transmit signal is input, the predistortion apparatus examines whether the input transmit signal value has the linear or non-linear characteristic in step 803.

When the input transmit signal has the non-linear characteristic, the predistortion apparatus allocates the size of the upper bits to exhibit the non-linear characteristic in step 817. In other words, the resolution bit width of the non-linear transmit signal should be greater than the linear transmit signal. As such, the predistortion apparatus allocates the size of the upper bits of the non-linear transmit signal to be greater than the size of the upper bits of the linear transmit signal. For example, when the transmit signal includes sixteen (16) bits and four (4) bits are allocated to the size of the upper bits of the linear transmit signal, the predistortion apparatus allocates nine (9) bits to the size of the upper bits of the non-linear transmit signal.

In step 819, the predistortion apparatus divides the input transmit signal into the upper bits and the lower bits based on the size of the upper bits allocated in step 817. The upper bits extracted by the predistortion apparatus are used as the address value for retrieving the distorted transmit signal value from the memory block. The ratio of the upper bits and the lower bits is determined by the characteristics of the power amplifier.

In step 821, the predistortion apparatus generates two sequential address values using the upper bits. More specifically, the predistortion apparatus successively generates the input address value and the next address value of the upper bits. For example, given the upper bits '1010000000', the predistortion apparatus sequentially generates '1010000000' and '1010000001'.

In step 823, the predistortion apparatus confirms the distorted transmit signal value corresponding to the address value and the next address value generated in step 821, in the LUT according to the non-linear characteristic.

In step 825, the predistortion apparatus multiplies the difference of the two generated sequential address values by the lower bits. The product of the multiplication is the distorted signal value of the transmit signal corresponding to the lower bits.

In step 827, the predistortion apparatus adds the distorted transmit value corresponding to the address value generated in step 821 and the product acquired in step 825. The output of the predistortion apparatus indicates the distorted signal value corresponding to the transmit signal fed in step 801.

When the input transmit signal is linear in step 803, the predistortion apparatus allocates the size of the upper bits to represent the linear characteristic in step 805. In other words, the resolution bit width of the non-linear transmit signal should be greater than the linear transmit signal. As such, the predistortion apparatus allocates the size of the upper bits of the linear transmit signal to be smaller than the size of the upper bits of the linear transmit signal.

In step 807, the predistortion apparatus divides the input transmit signal into the upper bits and the lower bits in the size of the upper bits allocated in step 805. The upper bits extracted by the predistortion apparatus are used as the address value for retrieving the distorted transmit signal value from the memory block. The ratio of the upper bits and the lower bits is determined by the characteristic of the power amplifier.

In step 809, the predistortion apparatus generates two sequential address values using the upper bits. More specifically, the predistortion apparatus successively generates the input address value and the next address value of the upper bits. For example, given the upper bits '1010', the predistortion apparatus sequentially generates '1010' and '1011'.

In step 811, the predistortion apparatus confirms the distorted transmit signal value corresponding to the address value and the next address value generated in step 809, in the LUT according to the linear characteristic.

In step 813, the predistortion apparatus multiplies the difference of the two generated sequential address values by the lower bits. The product of the multiplication is the distorted signal value of the transmit signal corresponding to the lower bits.

In step 815, the predistortion apparatus adds the distorted transmit value corresponding to the address value generated in step 809 and the product acquired in step 813. The output of the predistortion apparatus indicates the distorted signal value corresponding to the transmit signal fed in step 801.

Next, the predistortion apparatus finishes this process.

When the predistortion apparatus distorts the transmit signal as mentioned above, the amplifier amplifies and transmits the distorted transmit signal.

In the exemplary embodiments of the present invention, the predistortion apparatus generates the distortion signal of the transmit signal using the distorted signal values of the LUT of the memory block. When the LUT contains no distortion signal corresponding to the transmit signal, the predistortion apparatus can generate the distortion signal of the transmit signal by use of the interpolation.

As set forth above, the memory capacity of the LUT of the predistortion apparatus of the DPD power amplifier is reduced in the wireless communication system. Therefore, the time taken to update the LUT can be shortened, the cost can be lowered by the reduced memory capacity, and the power consumption can be decreased.

While the invention has been shown and described with reference to certain exemplary embodiments thereof, it will be understood by those skilled in the art that various changes in form and details may be made therein without departing from the spirit and scope of the invention as defined by the appended claims and their equivalents.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method for predistorting an input signal at a predistortion apparatus of a digital pre-distortion power amplifier, the method comprising:
   dividing, by at least one extractor, one or more bits of the input signal into upper bits and lower bits;
   generating, by an address generator, two successive address values using the upper bits;
   generating, by a memory block, distortion values of the upper bits corresponding to the address values;
   determining, by a data extractor, a distortion value of the lower bits; and
   determining, by a serial subtractor, a distortion signal value corresponding to the input signal using the distortion values of the upper bits and the distortion bit of the lower bits.

2. The method of claim 1, wherein the generating of the distortion values of the upper bits comprises:
   selecting distortion values of upper bits corresponding to the two successive address values from a look up table which comprises one or more distortion values corresponding to upper bits of a transmit signal.

3. The method of claim 1, wherein the generating of the distortion values of the upper bits comprises:
   checking whether a look up table stores distortion values of upper bits corresponding to the two successive address values; and
   when the look up table stores no distortion values of the upper bits corresponding to the two successive address values, generating distortion values of the upper bits using an interpolation;
   wherein the look up table comprises one or more distortion values corresponding to upper bits of a transmit signal.

4. The method of claim 1, wherein the determining of the distortion value of the lower bits comprise:
   multiplying a difference of distortion values of upper bits corresponding to the two successive address values by a value of the lower bits.

5. The method of claim 1, wherein the determining of the distorted signal value corresponding to the input signal comprises:
   calculating the distorted signal value corresponding to the input signal by adding a distortion value of upper bits corresponding to an address value first generated among the distortion values of the upper bits, and a distortion value of the lower bits.

6. The method of claim 1, wherein the dividing to the upper bits and the lower bits comprises:
   dividing one or more bits constituting the input signal to upper bits and lower bits in a ratio of upper bits and lower bits determined according to the digital pre-distortion power amplifier.

7. The method of claim 1, further comprising:
   before dividing the input signal to the upper bits and the lower bits, checking a linear characteristic or a non-linear characteristic of the input signal; and
   checking a ratio of the upper bits and the lower bits according to the characteristic of the input signal,
   wherein the one or more bits constituting the input signal are divided to the upper bits and the lower bits in the checked ratio.

8. The method of claim 7, wherein the ratio of the upper bits and the lower bits according to the characteristic of the input signal defines a size of the upper bits according to the non-linear characteristic to be greater than a size of the upper bits according to the linear characteristic.

9. The method of claim 8, wherein, in the look up table which comprises one or more distortion values corresponding to upper bits of a transmit signal, a look up table for the non-linear characteristic comprises a greater number of distortion values than a look up table for the linear characteristic according to the size of the upper bits of the non-linear characteristic and the size of the upper bits of the linear characteristic.

10. A predistortion apparatus of a digital pre-distortion power amplifier, the apparatus comprising:
 a 2-step sequence address generator configured to generate two successive address values using upper bits of a plurality of bits of an input signal, the plurality of bits divided into the upper bits and lower bits;
 a memory block configured to generate distortion values of the upper bits corresponding to the address values respectively;
 a multiplier configured to produce a distortion value of the lower bits by multiplying the distortion values of the upper bits by the lower bits; and
 an adder configured to determine a distortion signal value corresponding to the input signal by adding the distortion values of the upper bits and the distortion value of the lower bits.

11. The predistortion apparatus of claim 10, further comprising:
 a most significant bit extractor configured to separate one or more upper bits from the input signal in a ratio of upper bits and lower bits determined by characteristic of the input signal; and
 a least significant bit extractor configured to separate one or more lower bits from the input signal in the ratio of the upper bits and the lower bits determined by the characteristic of the input signal.

12. The predistortion apparatus of claim 10, wherein the memory block is configured to select distortion values of the upper bits corresponding to the two successive address values from a look up table that comprises one or more distortion values corresponding to upper bits of the input signal.

13. The predistortion apparatus of claim 10, further comprising:
 a distortion signal generator configured to, when a look up table of the memory block stores no distortion values of upper bits corresponding to the two successive address values, generate distortion values of upper bits using an interpolation.

14. The predistortion apparatus of claim 10, wherein the multiplier is configured to determine the distortion value corresponding to the lower bits by multiplying a difference of distortion values of upper bits corresponding to the two successive address values by a value of the lower bits.

15. The predistortion apparatus of claim 10, wherein the adder is configured to determine the distorted signal value corresponding to the input signal by adding a distortion value of upper bits corresponding to an address value first generated among the distortion values of the upper bits, and a distortion value of the lower bits.

16. A predistortion apparatus of a digital pre-distortion power amplifier, the apparatus comprising:
 a boundary detector configured to check a linear characteristic or a non-linear characteristic of an input signal;
 at least two 2-step sequence address generators according to the characteristic of the input signal, configured to generate two successive address values using upper bits among the upper bits and lower bits divided in a ratio of upper bits and lower bits determined by the characteristic of the input signal;
 at least two memory blocks according to the characteristic of the input signal, configured to generate distortion values of upper bits corresponding to the address values respectively;
 at least two multipliers according to the characteristic of the input signal, configured to determine a distortion value of the lower bits by multiplying the distortion values of the upper bits by the lower bits; and
 at least two adders according to the characteristic of the input signal, configured to determine a distorted signal value corresponding to the input signal by adding the distortion values of the upper bits and the distortion value of the lower bits.

17. The predistortion apparatus of claim 16, further comprising:
 at least two most significant bit extractors according to the characteristic of the input signal, configured to separate one or more upper bits from the input signal in a ratio of upper bits and lower bits determined by characteristic of the input signal; and
 at least two least significant bit extractors according to the characteristic of the input signal, configured to separate one or more lower bits from the input signal in the ratio of the upper bits and the lower bits determined by the characteristic of the input signal.

18. The predistortion apparatus of claim 16, wherein the memory block according to the non-linear characteristic of the input signal is configured to select distortion values of the upper bits corresponding to the two successive address values from a non-linear look up table which comprises one or more distortion values corresponding to upper bits of the non-linear input signal, and
 the memory block according to the linear characteristic of the input signal is configured to select distortion values of the upper bits corresponding to the two successive address values from a linear look up table which comprises one or more distortion values corresponding to upper bits of the linear input signal.

19. The predistortion apparatus of claim 18, wherein the non-linear look up table comprises a greater number of distortion values than the linear look up table.

20. The predistortion apparatus of claim 16, further comprising:
 at least two distortion signal generators according to the characteristic of the input signal configured to, when the look up tables of the memory blocks store no distortion values of upper bits corresponding to the two successive address values, generate distortion values of upper bits using an interpolation.

21. The predistortion apparatus of claim 16, wherein the multiplier according to the non-linear input signal is configured to determine the distortion value of the lower bits for the non-linear input signal by multiplying a difference of distortion values of upper bits corresponding to the two successive address values by a value of the lower bits, and
 the multiplier according to the linear input signal is configured to determine the distortion value of the lower bits for the linear input signal by multiplying the difference of distortion values of the upper bits corresponding to the two successive address values by the value of the lower bits.

22. The predistortion apparatus of claim 16, wherein the adder according to the non-linear input signal is configured to determine the distorted signal value corresponding to the non-linear input signal by adding a distortion value of upper bits corresponding to an address value first generated among the distortion values of the upper bits, and a distortion value of the lower bits, and the adder according to the linear input signal is configured to determine the distorted signal value corresponding to the linear input signal by adding the distortion value of the upper bits corresponding to the address value first generated among the distortion values of the upper bits, and the distortion value of the lower bits.

* * * * *